(12) United States Patent
Gilmore

(10) Patent No.: US 6,613,217 B1
(45) Date of Patent: Sep. 2, 2003

(54) ELECTROCOAGULATION CHAMBER AND METHOD

(76) Inventor: F. William Gilmore, 2570 S. Dayton Way, G112, Denver, CO (US) 80231

( * ) Notice: Subject to any disclaimer, the term of this patent is extended or adjusted under 35 U.S.C. 154(b) by 0 days.

(21) Appl. No.: 09/980,653

(22) PCT Filed: Apr. 28, 2000

(86) PCT No.: PCT/US00/11698

§ 371 (c)(1),
(2), (4) Date: Oct. 24, 2001

(87) PCT Pub. No.: WO00/66500

PCT Pub. Date: Nov. 9, 2000

Related U.S. Application Data

(60) Provisional application No. 60/131,551, filed on Apr. 29, 1999.

(51) Int. Cl.[7] .......................... C02F 1/461; C02F 1/463; C02F 1/465
(52) U.S. Cl. ........................ 205/755; 205/756; 205/757; 204/554; 204/571; 204/268; 204/269; 204/270; 204/660; 204/673
(58) Field of Search ................................ 205/755, 756, 205/757; 204/554, 571, 268, 269, 270, 660, 673

(56) References Cited

U.S. PATENT DOCUMENTS

| | | | |
|---|---|---|---|
| 3,663,413 A | 5/1972 | Marmo | |
| 3,793,171 A | 2/1974 | Zabolotny | |
| 4,770,755 A | 9/1988 | Valanti et al. | |
| 5,049,252 A | 9/1991 | Murrell | |
| 5,928,493 A | 7/1999 | Morkovsky | |
| 6,294,061 B1 | * 9/2001 | Morkovsky et al. | ........ 204/242 |

* cited by examiner

*Primary Examiner*—Arun S. Phasge
(74) *Attorney, Agent, or Firm*—Kyle W. Rost

(57) ABSTRACT

A stream of process liquid is treated while flowing through in a horizontally elongated chamber having an open top. Longitudinally elongated electrode blades are aligned with the longitudinal dimension of the chamber. An overhead disbursement chamber supplies a sweeping air stream over the open top of the chamber for removing foam and gas reaction by-products. The electrode blades are separated and held at a desired spacing by small portable guides located below and above the blades.

8 Claims, 7 Drawing Sheets

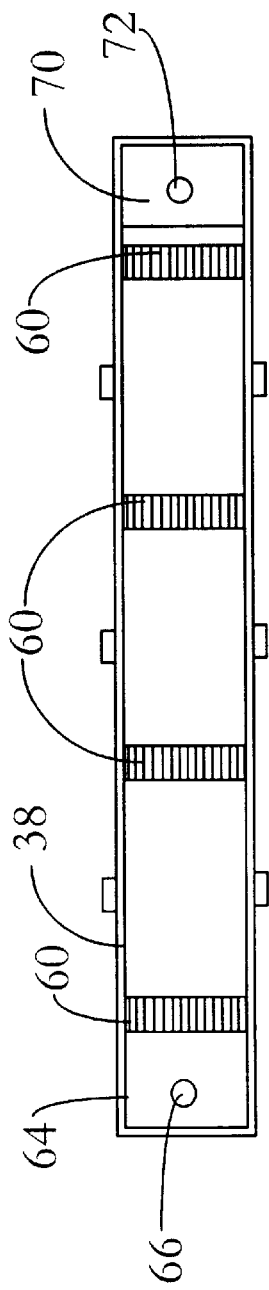
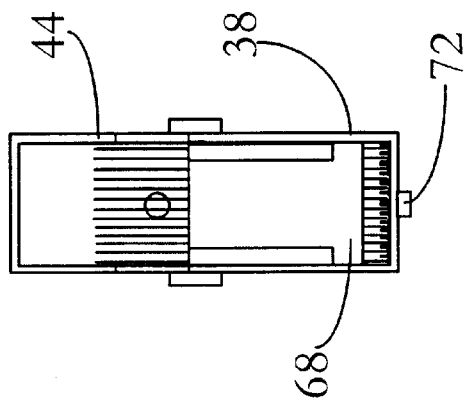
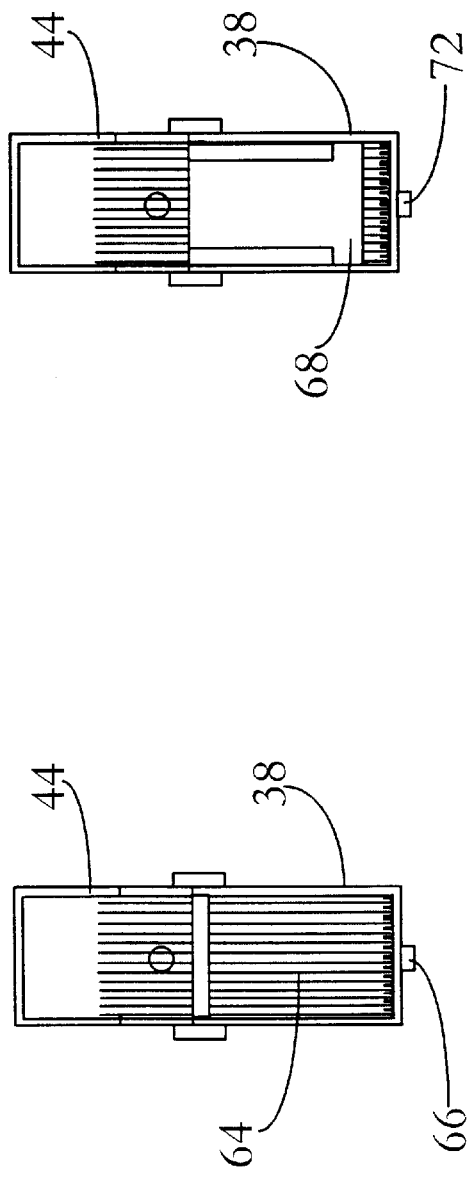

ELECTROCOAGULATION CHAMBER AND METHOD

This Application is a 371 of PCT/US00/11698 filed Apr. 28, 2000, which claims benefit of 60/131,551 filed Apr. 29, 1999.

TECHNICAL FIELD

The invention generally relates electrical chemistry and to processes and A compositions used for electrolysis. More specifically, the invention relates to electrolytic material treatment of water, sewage and other waste water. Another aspect of the invention relates to liquid purification and separation utilizing electrical or wave energy.

BACKGROUND ART

The separation of an aqueous solution into water and an agglomerate can be accomplished by applying a voltage across the solution. While this process is effective, it involves a series of problems that increase the complexity of the necessary equipment and increase the cost of treatment. An initial problem is that in addition to the basic separation into water and agglomerate, it is common for an electrolytic treatment involving water to produce electrolysis of the water into hydrogen and oxygen, which must be removed for safety reasons. In addition, such treatment produces a foam on top of the liquid in the electrolytic treatment chamber. This foam contains impurities and undesirable components that must be removed from the treated water. Although the foam is generated in a reaction chamber, it is allowed to remain with the treated water through a considerable portion of downstream processing, eventually being removed in a secondary separation system. Processing foam in such a downstream treatment apparatus can add substantially to the cost of treatment.

Conventional treatment systems utilize a vacuum source to remove foam. Such a vacuum source supplies high vacuum and is quite expensive in its power consumption. A substantial cost of treatment is the high vacuum system, which often uses more power than the reaction chamber itself and all of the pumps used in a typical system.

Electrodes are employed to pass a current through water. The current typically is DC or rectified AC. Suitable electrodes are formed of metal such as copper, silver, iron, or aluminum. In most applications, electrolytic treatment is considered costly both in consumption of electricity and in consumption of electrodes. A problem that substantially increases cost is hydrogen deposition on the electrodes. Hydrogen interferes with the efficient use of electricity and increases power requirements.

Electrolysis commonly is performed in a vertical up-flow reaction chamber. Vertical up-flow can be beneficial when it assists in sweeping hydrogen build-up from the electrodes and removes foam and gas from the reaction chamber. The electrodes typically are plates or blades mounted in the reaction chamber in a fixed position. The blades typically are elongated in one dimension, and the reaction chamber usually receives the blades with the elongated dimension positioned vertically. Several problems are inherent to vertical orientation. These include the substantial overhead space requirement above the reaction chamber to allow installation and removal of the blades. Another is a lateral support or bracing requirement, to support a tall, narrow reaction chamber.

The two most common techniques of mounting blades in the reaction chamber are the grooved wall and the fixed bundle. Both create a problem in that they are costly and awkward. However, the requirements of a vertical blade reaction system leave little choice.

The grooved wall is created by forming guide slots within the walls of the reaction chamber, itself. Each blade is dropped into the chamber with its vertical side edges engaged in an opposed pair of such slots. When all blades are installed, each occupies a defined position and a fixed gap separates each blade from the next. The size of gap is dictated by the spacing of the grooves in the reaction chamber wall. Likewise, the thickness of the blades is dictated by the width of the slots. While the grooved wall system is effective, it creates a problem in flexibility for different applications. The reaction chamber is not well suited to use a different size or number of blades, and the gap between blades cannot readily be altered. However, since a vertical reaction chamber tends to be quite deep and not very wide, it appears necessary to guide the blades with a structure that can be engaged at the top of the chamber. Hence, the long vertical slots are used of necessity.

The fixed bundle mounting technique employs blades assembled by bolting together the blades into a unit with spacers inserted between them. The bundle is dropped into a reaction chamber as a unit, or lifted from it, as a single unit A bundle offers an advantage in flexibility, since the number and thickness of blades can be selectively altered, as can the gap between blades by using a different spacer. The primary problem with a bundle is the bundle, itself. It tends to be heavy and difficult to manipulate. Every maintenance activity requires removing the entire bundle from the reaction chamber. Cleaning, removing, adding, or replacing a blade requires disassembly and reassembly of the entire bundle. The fixed bundle eliminates the need for long vertical slots at the expense of considerable awkwardness of another type.

It would be desirable to overcome these problems of electrolytic processing so that costs can be reduced and efficiency can be increased.

To achieve the foregoing and other objects and in accordance with the purpose of the present invention, as embodied and broadly described herein, the electrocoagulation chamber and method of this invention may comprise the following.

DISCLOSURE OF INVENTION

The objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, an electrocoagulation chamber processes a horizontally flowing stream of process liquid. The chamber is constructed of a bottom wall and opposite side walls of predetermined width. Together, they define a generally horizontal, longitudinally elongated channel, in which at least a portion of the channel has an open top. A process liquid is supplied through an inlet into a first longitudinal end of the channel. The process liquid is removed from the channel through an outlet at the opposite longitudinal end of the channel. Longitudinally elongated electrode blades of predetermined height are disposed in the channel between the inlet and outlet. The blades are longitudinally aligned with the longitudinal dimension of the channel. A disbursement chamber is in fluid communication with the portion of the channel having the open top. An air stream of positive pressure enters the disbursement chamber at a predetermined air entry location, and a cooperating negative pressure is drawn from the chamber at a predetermined air exit location. The entry location and exit location are spaced from each other in order to establish a sweeping air stream between them.

The electrocoagulation chamber may employ an adjustable baffle for controlling the flow of process liquid through the channel. The baffle is disposed between the electrode blades and the outlet and may allow flow both under and over the baffle wall. It closes the second longitudinal end of the channel to at least the height of the electrode blades in the channel, ensuring that the process liquid covers the blades.

The electrocoagulation chamber may employ at least one slotted portable blade guide. The slot is sized to receive an edge of an electrode blade. The blade guide is positioned in the reaction chamber on top of at least one of the electrode blades, and the slot in the blade guide engages a top edge of the electrode blade. The blade guide covers only a minor portion of the length of the elongated electrode blade. A second, similar portable blade guide may be positioned on the bottom of the reaction chamber and below at least one of the electrode blades, where the bottom edge of the electrode blade is engaged in the guide slot of the second blade. A blade guide may have a width approximately equal to the predetermined width of the channel, so that it will support the engaged edge of the electrode blade in a fixed position between the sides of the channel.

Another aspect of the invention provides a method of continuously processing a liquid stream flowing through an electrocoagulation chamber. The steps of the method provide an,elongated, generally horizontal electrocoagulation chamber having an open top over at least a portion of the chamber. Further, a plurality of longitudinally elongated electrode blades of a predetermined height are disposed in the chamber with their longitudinal dimension generally aligned with the longitudinal dimension of the chamber. The process liquid is continuously supplied into a first longitudinal end of the chamber for longitudinal flow through the chamber. The liquid in the chamber is continuously treated by electrocoagulation, thereby generating foam and gas byproducts. These by-products are continuously entrained in a sweeping air stream applied over the flowing liquid at the open top portion of the chamber. The air stream and entrained contents are continuously removed from the chamber at an air stream exit. The process liquid is continuously removed from the second longitudinal end of the chamber.

The method includes controlling the flow of process liquid through the chamber by interposing a baffle between the electrode blades and second end of the chamber. The baffle closes the second end of the channel to at least the predetermined height of the electrode blades within the chamber, thereby ensuring that process liquid covers the blades.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 3 is a top plan view of the reaction chamber without blades present but with bottom blade guides in place.

FIG. 5 is an end elevational view of the inside of the reaction chamber taken from the inlet chamber.

FIG. 6 is an end elevational view of the inside of the reaction chamber taken from the outlet chamber and showing the baffle.

BEST MODE FOR CARRYING OUT THE INVENTION

Figure 1:
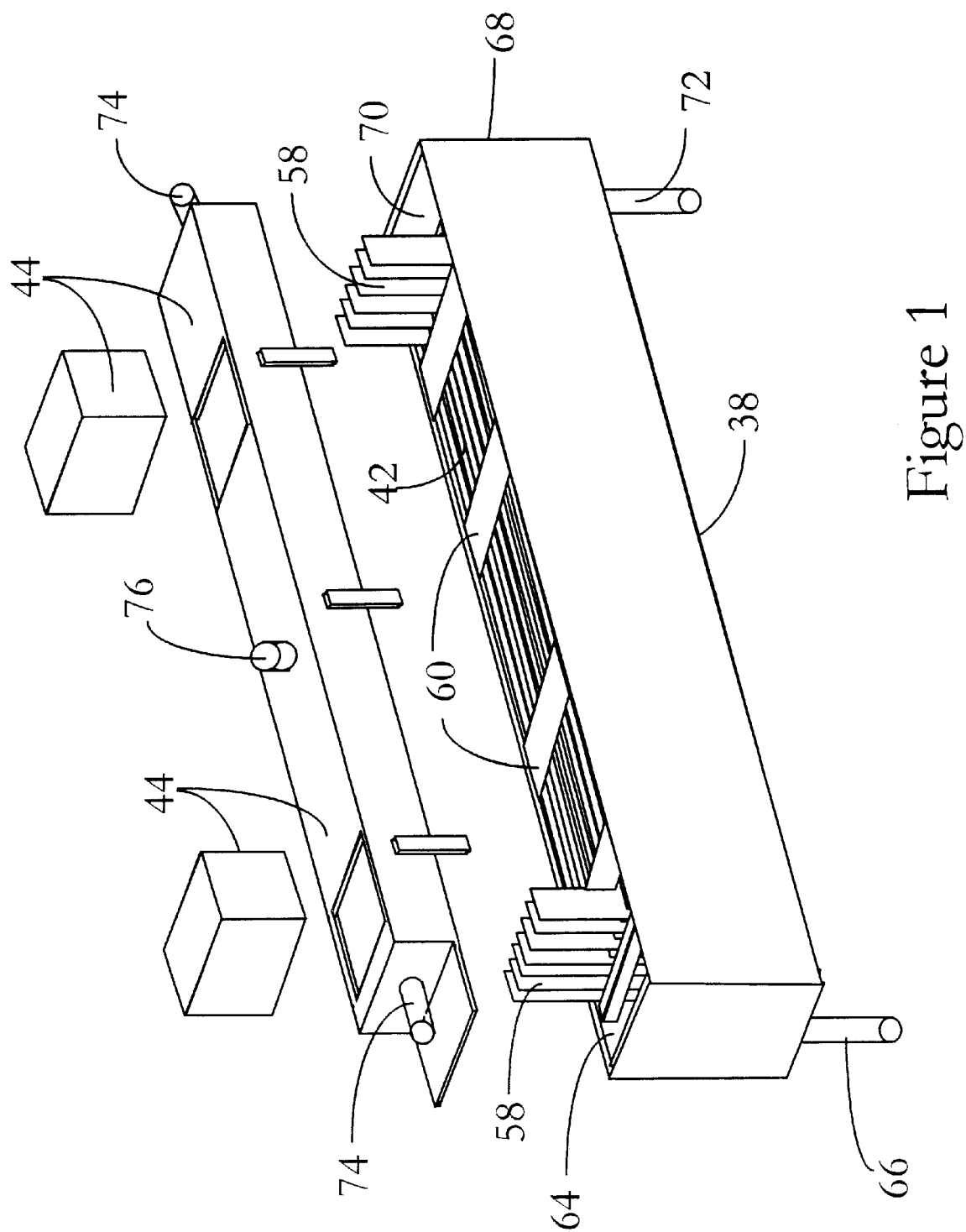
FIG. 1 is an exploded, isometric view of a reaction chamber constructed for practice of the invention.

The invention provides a unique horizontal flow reaction chamber with reaction blades having their major dimension horizontally oriented for treating water by electrocoagulation. This orientation of the reaction blades solves a number of a significant problems in the art. Among these, the configuration provides a substantially larger surface area on top of the liquid in the reaction chamber for enabling foam and gases to escape from the treated water and be removed from the processing system. A horizontal blade disposition also greatly simplifies maintenance because the reaction blades can be serviced by lifting a blade a minor distance such as 30.5 cm (1 ft.), in contrast to lifting a blade a major distance as 122 cm (4 ft.) as required in an equivalent vertical flow system. By disposing the blades with their major dimension in a horizontal direction, it becomes possible as well as practical to treat waste streams having a requirement for a significantly greater degree of treatment. For example, unusually long blade lengths, such as 1.83 m, 2.44 m, and 3.05 m long (6, 8, or 10 feet long) now can be utilized in a facility having little or no special structural adaptation to receive the chamber and provide adequate overhead room for servicing the blades.

The reaction chamber, itself, benefits from horizontal orientation. Weight distribution is superior to that of an equivalent vertical system. The chamber can be supported in a position of improved stability with relatively lower center of mass. In addition, the shape or length of the reaction chamber can be modified to meet the requirements for treating a greater variety of liquids. For example, the chamber can be sized to accommodate the longer reaction blades previously mentioned. As a practical matter, maintenance considerations effectively limit a vertical chamber to containing 122 cm (4 ft.) blades.

A horizontal system can utilize improved blade guides formed as discrete portable units that are removable from the reaction chamber independently of the reaction blades. Because the chamber is horizontal, it has a large amount of top access as compared to its depth. Thus, it is easy to work with discrete portable blade guides that are positioned on the bottom of the chamber and receive the lower edges of the blades. Similar discrete portable blade guides are placed over the top of the blades. The guides are desired to be small, both because they will be easy to handle and because it is desirable to leave open space on top of the blades for venting hydrogen and other gases or foam. It is preferred that the top blade guides cover no more than twenty-five percent of the top edges of the blades, so that a substantial portion of the reaction chamber is in open communication with the disbursement chamber.

Portable, discrete, unitary blade guides offer a cost advantage as well as operational flexibility. The blade guide grooves can be cut into a single sheet of plastic, which, in turn, is cut into individual blade guides. Such manufacture, independent of the reaction chamber wall, itself, provides consistency of spacing for each reaction chamber. Because the grooves are not an integral part of the reaction chamber, the spacing between blades can be altered to optimize treatment for processing different liquids. This result is in sharp contrast to conventional practice in which a reaction chamber is limited to a single blade spacing scheme, which may not provide the optimum performance in every case.

Unitary blade guides employ one or more independent top blade guides and bottom blade guides. These independent guides enable improved simplicity in removing blades for cleaning or replacement. The top blade guides can be removed independently of the bottom guides, allowing the array of reaction chamber blades to collapse laterally. This collapse provides improved access to the blades and allows each one to be gripped for removal. In contrast, a fixed groove system provides a narrow access, such as only 0.32 cm (⅛ in.) between blades.

The horizontal processing system employs an improved and simplified system for liquid flow control. The process liquid flows horizontally through the reaction chamber, entering it through a passage at one end and exiting through a passage at the opposite end. Flow control is achieved by placing an adjustable baffle or low, partial wall near the exit end of the reaction chamber. The baffle adjusts flow rate, determines how high the process liquid must rise in the reaction chamber and, correspondingly, is residence time. It is possible to change those factors by moving the baffle to a different height, altering its clearance from the bottom of the reaction chamber.

Foam and gas removal in a horizontal system is conducted with improved efficiency. The processing system is conducted at ambient pressure and is not required to be sealed from the atmosphere, although the foam and gas removal system employs a hood or lid that defines a disbursement chamber over the reaction chamber. At ambient pressure, foam and gas are removed by a two-sided gas sweeping system. Air is supplied under pressure into the disbursement chamber from entry ports at one or both ends of the chamber. A low vacuum, which can be supplied at low cost, is applied at a vacuum exit port that is spaced from the entry port, establishing a gas sweeping pattern between the entry and exit ports in the disbursement chamber.

Both foam and gas are picked-up in the air flow and removed through the vacuum exit port. The removal of foam and gas through a different exit than the processed liquid provides a significant reduction in the cost and complexity of any downstream secondary separation system. This early separation and removal of foam and gas largely is enabled by the horizontal character of the processing system, which supplies a large surface area on top of the reaction chamber, as compared to the volume of the chamber. A related advantage of the large surface area is that hydrogen build-up on the reaction blades is reduced, further lower operational cost.

Oxygen or ozone are supplied to the process liquid upstream of the reaction chamber. The ozone is useful for treating certain contaminants that the electrolytic process does not treat. Both ozone and oxygen tend to accelerate the oxidation process that normally occurs in the reaction chamber.

Figure 11:
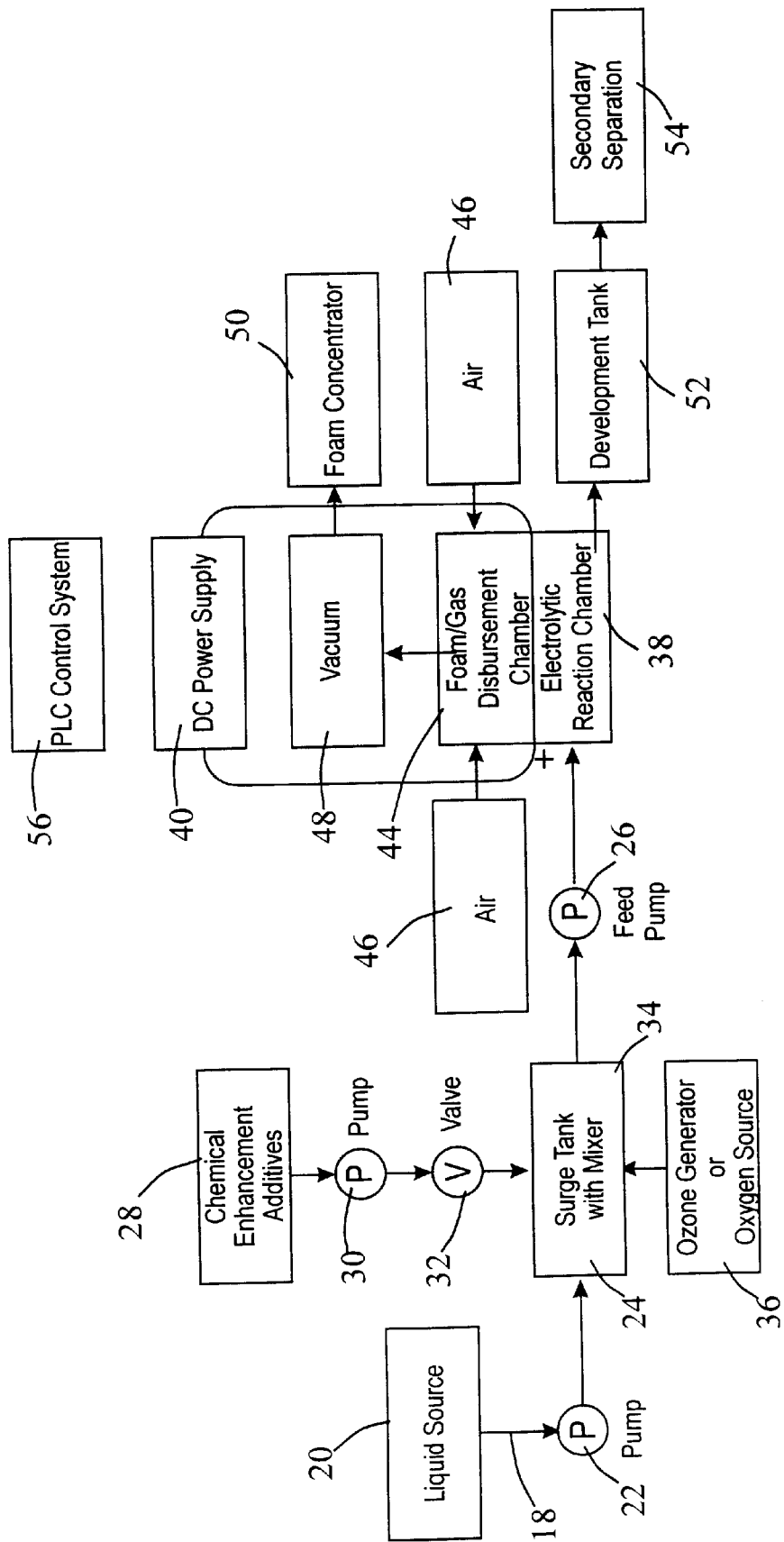
FIG. 11 is a schematic view of electrocoagulation hydraulic flow.

Flow of Material Through the System:

With reference to FIG. 11, a liquid 18 to be treated is supplied from a liquid source 20. Such liquid may be waste water, drinking water, or process water and therefore may be considered to have substantial water content regardless of its specific characterization. Pump 22 transmits such liquid to a surge tank 24 at a predetermined rate. The pump may be operable at either a fixed rate or selectable variable rate.

The surge tank 24 serves as a liquid supply reservoir and provides for flooded suction for a feed pump 26. In addition, the surge tank can serve two additional functions. First, chemical enhancement additives can be supplied from a source 28 by action of a metering pump 30 feeding the additives through a control valve 32 in the surge tank. Suitable chemical additives may be acid or caustic to adjust the pH of the surge tank contents. Other selected chemicals may be selected to enhance the treatment of the specific liquid being treated. When chemical additives are used, the surge tank is equipped with a static mixer 34. Second, an ozone generator or oxygen source 36 is in communication with the surge tank. Ozone or oxygen can be injected into the liquid 18 in the surge tank to start an oxidation process and to enhance the normal oxidation process that subsequently takes place in the electrolytic reaction chamber 38.

Figure 9:
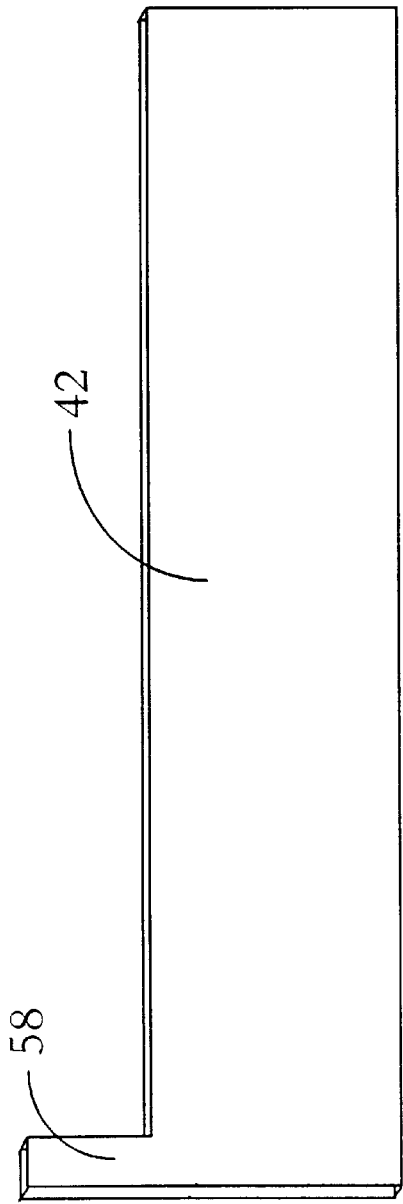
FIG. 9 is a side elevational view of an electrical connector electrocoagulation blade.
Figure 10:
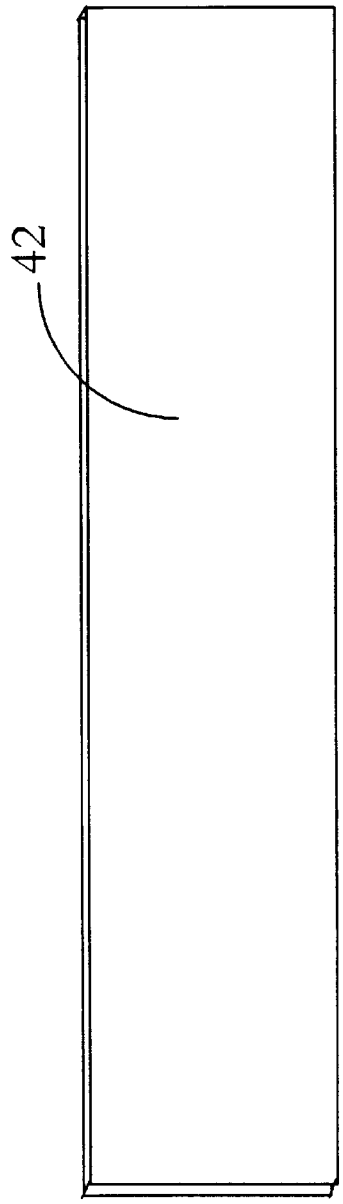
FIG. 10 is a side elevational view of a non-electrical connector electrocoagulation blade.

The feed pump 26 moves liquid 18 from the surge tank into and through the electrolytic reaction chamber, where the liquid fills the gap between reaction chamber blades 42, shown in FIGS. 1, 9, and 10.

In the chamber 38, DC current from a DC power supply 40 is applied to reaction chamber blades, where the electricity passes through the liquid 18 and causes electrically induced reactions. Liquid flows through the reaction chamber in a generally linear, horizontal path between an inlet end and an outlet or discharge end. The inlet receives pumped liquid from feed pump 26. The discharge end allows the liquid to exit the chamber under, over, or through an adjustable baffle.

The top of the reaction chamber is provided with a foam/gas disbursement chamber 44 that collects any foam or gases generated in the reaction chamber. Air sources 46 supply air to both the inlet and outlet ends of the disbursement chamber to push any foam to the middle of the chamber, where a vacuum source 48 is applied to move the foam to a concentrator 50. An gas generated in the reaction chamber is similarly removed by the vacuum system.

Liquid 18 from the reaction chamber flows by gravity into a development tank 52, where the liquid resides for a period during which floc has an opportunity to start development. From the development tank, the liquid passes to a secondary separation system 54, such as a clarifier, filter press, filter, or the like.

The overall process can be controlled by a program logic controller (PLC) control system 56.

Detailed Description of the Primary Components:

A preferred surge tank 24 has sufficient capacity to hold a predetermined minimum reserve of liquid, such as 5 minutes of liquid 18, based upon the system flow rate. When chemical enhancement additives are used, a static mixer is provided in the tank to ensure the additives are thoroughly mixed in the liquid. When ozone is added, an ozone diffuser is located in the surge tank, and when oxygen added, a micro-bubbler is located in the bottom of the tank.

The chemical enhancement additives most commonly are acidic or caustic chemicals that alter the pH of the liquid.

When a pH adjustment is needed, the acid or caustic is pumped into the surge tank by metering pump 30, which is controlled by a pH probe in the surge tank. Other chemicals can be added in a similar way, in some instances by a metering pump controlled by a timer in the PLC control system 56.

The ozone generator 36 is sized according to the flow rate of the liquid 18. This additive is used to treat contaminants that will not be treated adequately in the electrolytic reaction chamber. It may be added for an additional purpose of increasing the speed of the overall oxidation rate. Ozone provides approximately thirteen times the oxidation of oxygen, alone.

Oxygen is added primarily to enhance the oxidation rate of processing. It is less expensive than ozone and is adequate to accomplish the required oxidation enhancement in certain liquid streams.

Details of the construction of the preferred reaction chamber 38 are shown in FIGS. 1–10. The chamber is designed to operate at atmospheric pressure, rather than in a sealed, high pressure environment. Thus, although the chamber is covered during operation, the cover need not be sealed. This arrangement is helpful in allowing removal of hydrogen, oxygen, and foam generated through application of the electrolytic process to the water portion of liquid 18. This design has distinct advantages over a pressurized chamber, where hydrogen tends to accumulate on electrode surfaces and increases power requirements by as much as 60% by impeding the flow of electricity through the liquid.

The reaction chamber contains a plurality of blades 42, for example twenty-eight blades in a chamber shown in FIG. 1. The dimensions of a typical blade may vary, although a suitable blade may be configured with opposed major surface areas about 1.22 meters (four feet) long and about 0.3 meters (one foot) high, equalling about 0.73 square meters (eight square feet) per blade. FIG. 10 shows a blade 42 of such configuration. A blade may be configured for electrical connection above the liquid bath. FIG. 9 shows a blade 42 similar to that of FIG. 10, but with an electrical connection extension 58 positioned to extend above the bath. A typical extension may be about 15.2 cm (six inches) in height and 5.08 cm (two inches) in length. The extension 58 provides a connection point for either positive or negative current. The blades are arranged and connected in the reaction chamber to have alternating polarity between adjacent blades. This polarity can be achieved by connecting opposite polarities to the first and last blades, connecting opposite polarities to each alternating blade, or various combinations of these connection systems.

The blades are mounted in the reaction chamber in horizontal position, with the major dimension of each blade extending approximately horizontally between the opposite ends of the reaction chamber. The major faces of each blade lie along generally vertical planes. The blade position is maintained by blade guides 60, best shown in FIGS. 5–8. These guides are small, easily removable and replaceable, and preferably formed of plastic. Each one defines a series of spacers or parallel ribs 62. The ribs are equally spaced and separated by blade slots that are approximately the width of a reaction blade. Thus, for example, a blade slot may be 0.40 cm (5/32 in.) wide, defined between two spacer ribs 62 that may be 0.24 cm (3/32 in.) wide. A single blade guide provides enough spacers to separate all of the blades within an entire bundle of reaction blades. As an example, a blade guide may be about 18.8 cm (7.4 inches) wide, which is approximately the width of the interior of the corresponding reaction chamber. Of course, the dimensions of the blade guides, the number of slots, and the width of the slots and spacers can be varied as required for a particular application.

Figure 8:
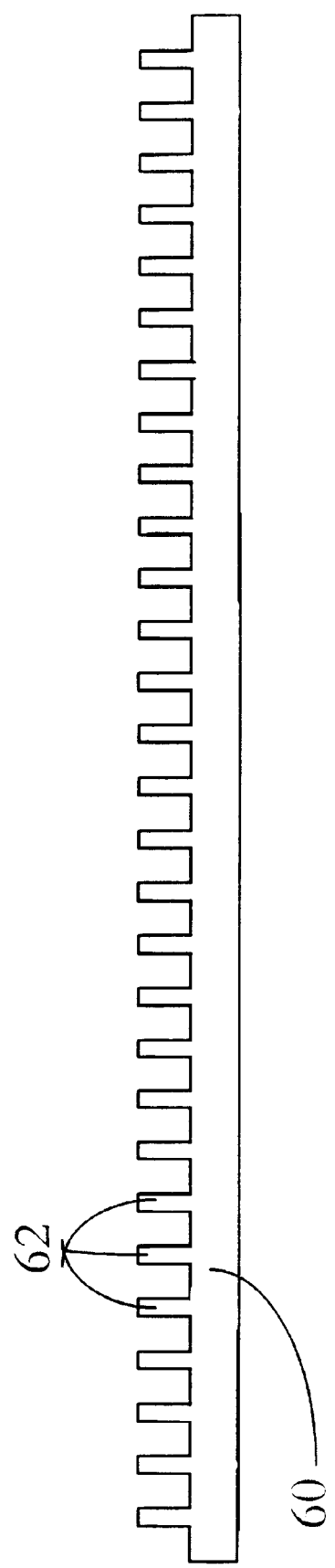
FIG. 8 is a side elevational view of a reaction chamber blade guide.

A blade guide is preferred to extend continuously over only a small fraction of the entire length of the reaction chamber, since it can perform its function by use of a plurality of small and easily handled blade guides applied to the blades at spaced intervals. The blade guide shown in FIG. 8 is only about 5.08 cm (two inches) in length, while the reaction chamber is 122 cm (48 inches) in length. Four such blade guides may be placed in spaced apart locations along the length of the bottom of the reaction chamber for receiving the lower edges of the blades in the slots. Four additional guides may be spaced on top of the reaction chamber blades, engaging the top edges of the blades in slots. The four top blade guides together cover only 20 cm (8 inches) of the 122 cm (48 inch) chamber length, or about 17%, leaving 83% of the chamber top fully open and in communication with the disbursement chamber. Together, the eight blade guides maintain the blades in a bundle that is closely packed but with juxtaposed blades slightly but evenly spaced apart. The placement and substitution of these guides can accomplished simply and inexpensively, making the reaction chamber extremely versatile for any specific processing requirement.

The flow of liquid 18 through the reaction chamber is horizontal, from the inlet end to the outlet end. The reaction chamber provides an inlet chamber 64 near on end of the blade bundle, where an inlet passage 66 receives liquid 18 from the feed pump 26. From the inlet end, the liquid flows through the gaps between reaction blades to the outlet. The outlet end is provided with an adjustable baffle 68 that may close the width of the outlet end of the chamber near the outlet end of the blades. The height of the baffle is adjusted within the reaction chamber to alter the rate of liquid flowing under the baffle. It is desirable to maintain a liquid height approximately equal to the top edge of the major surface of the blades. In the example illustrated in FIG. 6, the top of the baffle is below the electrical connection extension 58 of the blades. Liquid flow exiting under the baffle retains foam within the reaction chamber for removal from the system. A properly positioned baffle controls flow and ensures that the liquid will be backed up to the top of the blades. The processed liquid can flow under the baffle, through a gap between the baffle and the reaction chamber bottom, and into an outlet chamber 70 at the outlet end of the blades. The liquid then flows by gravity through the outlet passage 72 and to the development tank 52.

Figure 4:
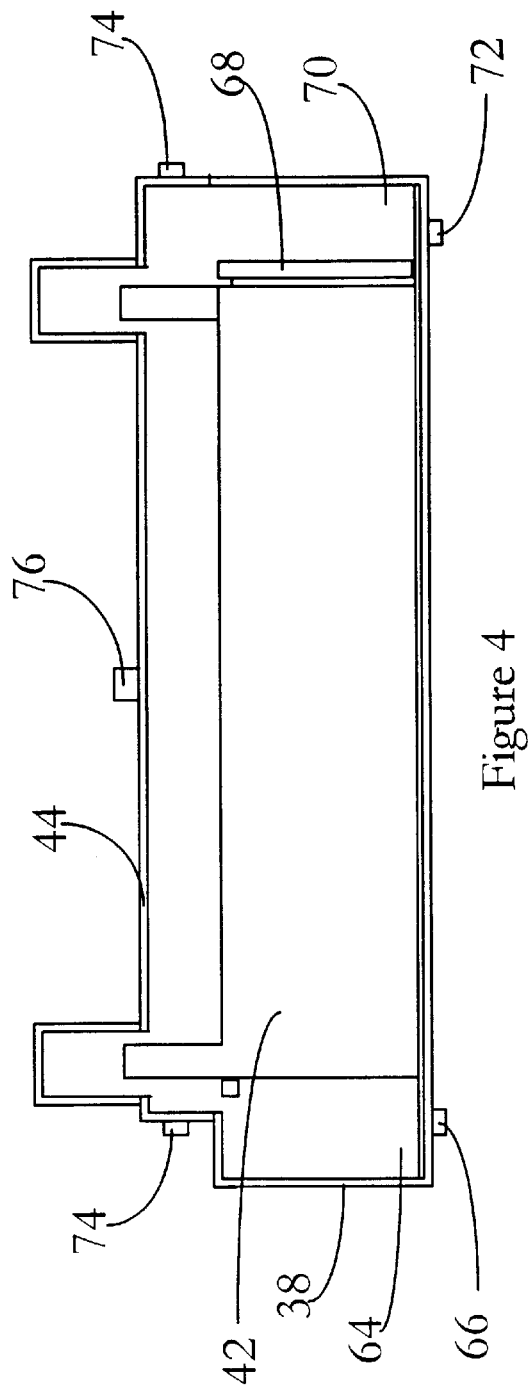
FIG. 4 is a side elevational view of the inside of the reaction chamber, showing the electrode blades in elevation.
Figure 2:
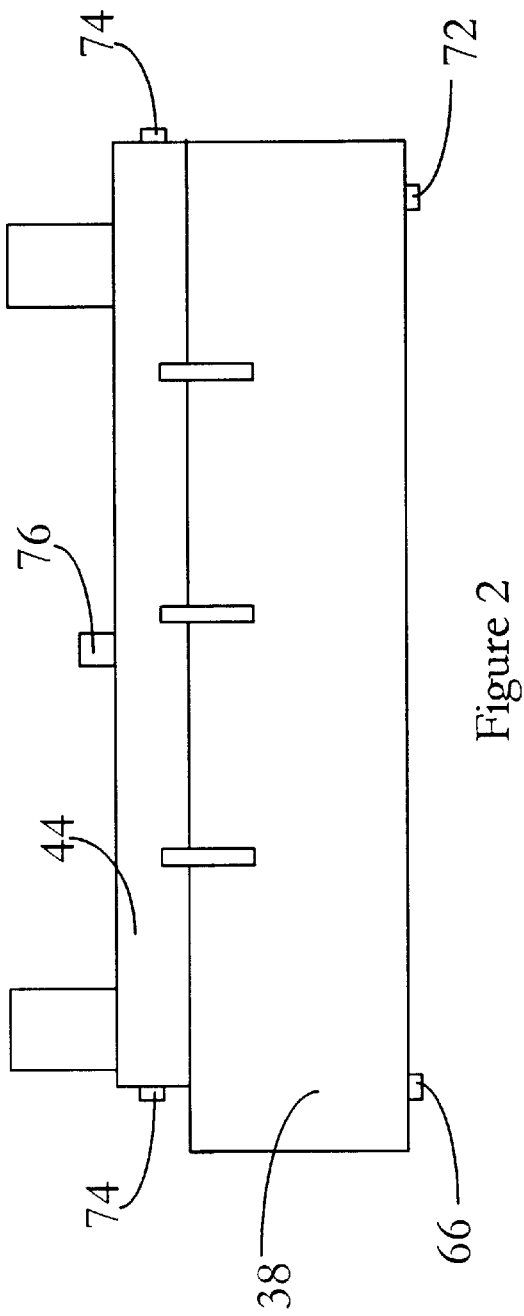
FIG. 2 is a side elevational view thereof.
Figure 7:
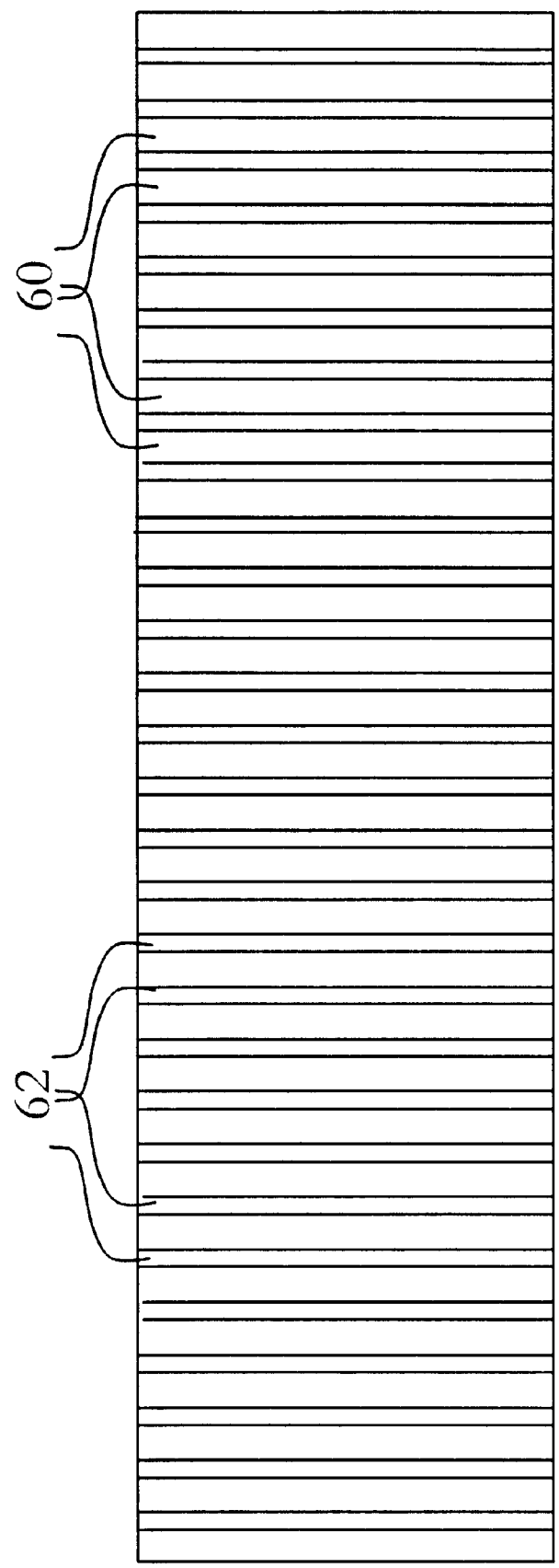
FIG. 7 is a top plan view of a reaction chamber blade guide.

Foam often is generated in electrolytic reactions and must be separated from treated liquid. The foam/gas disbursement chamber 44, best shown in FIGS. 1 and 4, is attached to the top of the reaction chamber. Although the disbursement chamber serves as a lid over the reaction chamber, contact with the ambient atmosphere is permitted and the lid need not be sealed against the reaction chamber. The disbursement chamber safely gathers and removes foam and gases that are generated by the electrical reaction with liquid 18 in the reaction chamber.

The inside of the disbursement chamber 44 contains a gas flow system in which a positive air pressure supplied by air sources 46 to air inlets 74 near the opposite ends of the disbursement chamber, which then sweep toward the center of the chamber 44. The sources of air pressure includes any source of positive air flow into the disbursement chamber. Thus, the source of air pressure may include a blower system supplying air by inwardly directed fans.

A vacuum source 48 applies a small vacuum at vacuum port 76 near the center of the disbursement chamber. A vacuum source, in the context of this invention, includes any source of negative air flow from the disbursement chamber. Thus, the vacuum source may include an exhaust system utilizing suction, such as by outwardly directed fans. The combination of air pressure and vacuum is effective to sweep foam and gases from the disbursement chamber and into a concentrator.

Compared to a vertical blade configuration, a horizontal blade configuration in reaction chamber 38 provides improved efficiency in eliminating hydrogen build-up from the blades and removal of foam and gas from the reaction chamber. The horizontal arrangement is especially useful in preventing hydrogen build-up on the blades and maintaining lower power utilization. An indicator of this efficiency is the ratio of top surface area of liquid in the reaction chamber compared to electrode vertical length below the surface. These ratios are proportional to the dimensions of an electrode blade, such as horizontal length to vertical length, or in the examples given 4:1 or simply 4. In a vertical chamber, these dimensions are reversed and the ratio is 1:4 or 0.25. Thus, a horizontal flow system can be defined as on in which the ratio of horizontal length to vertical length is greater than one, while a vertical system has a ration of less than one. The high comparative ratio of 4:0.25 or 16 reflects an advantage achieved in efficient removal of hydrogen from the blades.

The development tank 52 receives the processed liquid from the reaction chamber. The tank is sized to receive and retain the liquid for a retention period, typically about five minutes. This time period typically is sufficient for floc to begin to develop. From the development tank, the liquid is pumped to the secondary separation system 54 for further processing.

The DC power supply 40 typically produces rectified power from the AC grid. This power supply is of the type capable of reversing the polarity of its output. Each output reversal also reverses the polarity of the connected reaction blades. Such a reversal of blade polarity minimizes the buildup of oxides on the reaction chamber blades.

The PLC control system 56 operates in accordance with programmed instructions. The control system regulates the flow of liquid through the system. The system controls power to pumps, power to valves, and power to the reaction chamber blades.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. An electrocoagulation chamber for treating a horizontally flowing stream of process liquid by electrolysis, comprising:

a chamber formed of a bottom wall and a pair of side walls spaced apart in a predetermined chamber width, together defining a generally horizontal, longitudinally elongated treatment channel, in which at least a portion of said channel has an open top permitting diffusion of by-products of treatment;

an inlet means for supplying the process liquid into a first longitudinal end of the channel;

an outlet means for removing the process liquid from an opposite longitudinal end of the channel;

a plurality of elongated electrode blades of a predetermined height, disposed in the channel between said inlet means and outlet means, longitudinally aligned with the elongated dimension of the channel, for treating the stream of process liquid flowing in the channel;

a disbursement chamber in fluid communication with the portion of the channel having an open top for receiving and removing by-products of treatment;

a multiple means for creating a sweeping air stream within said disbursement chamber for entraining by-products of treatment, said multiple means including a first means supplying air at a relatively higher pressure into the disbursement chamber at a predetermined air entry location, and a second means drawing air at relatively lower pressure out of the disbursement chamber at a predetermined air exit location that is spaced from said air entry location, establishing a sweeping air stream between the air entry and air exit locations.

2. The electrocoagulation chamber of claim 1, further comprising:

a baffle controlling flow of process liquid through the channel, wherein said baffle is disposed between said electrode blades and said outlet means, and wherein the baffle partially closes the second longitudinal end of the channel sufficiently to retain the process liquid behind the baffle at least to the predetermined height of the electrode blades within the channel for ensuring that stream of process liquid covers the blades.

3. The electrocoagulation chamber of claim 1, further comprising:

at least one portable blade guide defining a slot sized to receive an edge of an electrode blade;

wherein the blade guide is positioned in the reaction chamber on top of at least one of the electrode blades; and the slot in the blade guide engages a top edge of the electrode blade.

4. The electrocoagulation chamber of claim 3, wherein:

said blade guide covers only a minor portion of the length of said elongated electrode blade.

5. The electrocoagulation chamber of claim 3, further comprising:

a second portable blade guide defining a slot sized to receive an edge of an electrode blade;

wherein the second blade guide is positioned on the bottom of the reaction chamber and below at least one of the electrode blades; and the slot in the blade guide engages a bottom top edge of the electrode blade.

6. The electrocoagulation chamber of claim 3, wherein said blade guide has a width approximately equal to the predetermined width of said treatment channel, supporting the engaged edge of the electrode blade in a fixed position between the sides of the chamber.

7. A method of continuously processing a liquid stream flowing through an electrocoagulation chamber, comprising:

providing an elongated, generally horizontal electrocoagulation chamber having an open top over at least a portion of the chamber, and providing a plurality of longitudinally elongated electrode blades of a predetermined height, disposed in the chamber with their longitudinal dimension generally aligned with the longitudinal dimension of the chamber;

continuously supplying a process liquid into a first longitudinal end of said chamber for longitudinal flow through the chamber;

continuously treating the process liquid in the chamber by electrocoagulation and thereby generating foam and gas by-products;

continuously entraining the by-products in a sweeping air stream applied over the flowing liquid at the open top portion of the chamber;

continuously removing the air stream and the entrained by-products from the chamber at an air stream exit; and continuously removing the process liquid from the chamber at the second longitudinal end of the chamber.

8. The method of claim 7, further comprising:

controlling the flow of process liquid through the chamber by interposing a baffle between the electrode blades and second end of the chamber, wherein the baffle backs-up flow of process liquid to at least the predetermined height of the electrode blades within the chamber by partially closing the second end of the channel, thereby ensuring that process liquid covers the blades.

* * * * *